May 12, 1964   J. E. GUILLOTTE ET AL   3,133,193
CORONA DISCHARGE APPARATUS FOR THE SURFACE
TREATMENT OF PLASTIC RESINS
Filed Jan. 22, 1962
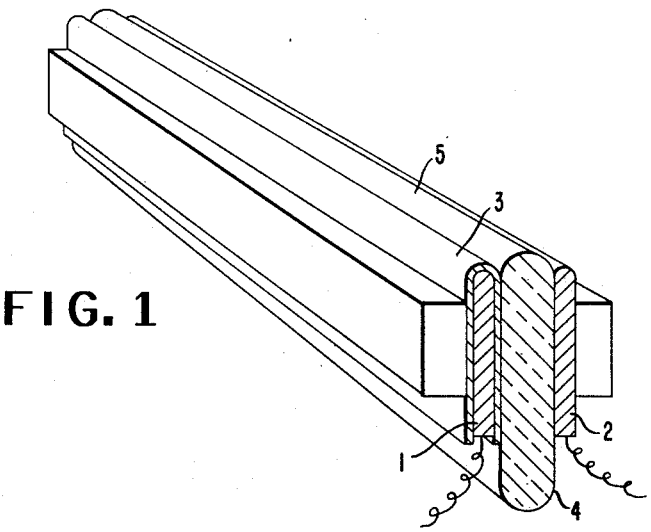
FIG. 1
FIG. 2
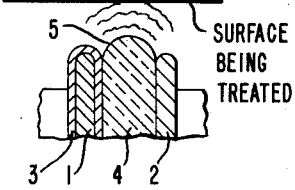
FIG. 3
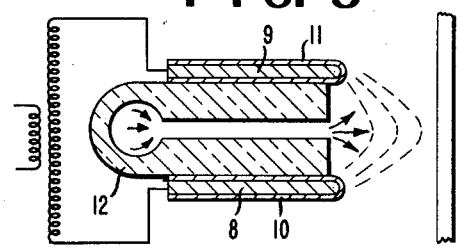
FIG. 4
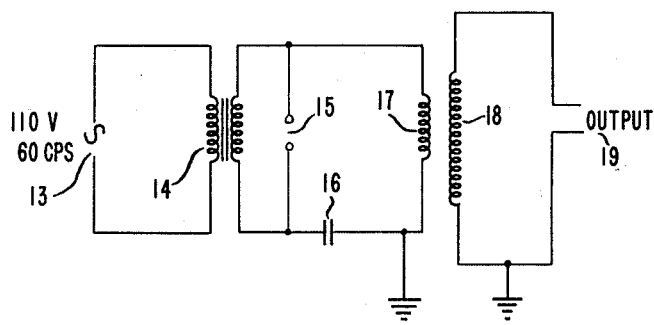
INVENTORS
JOHN EDWARD GUILLOTTE
THOMAS FRANCIS MCLAUGHLIN, JR.
BY
ATTORNEY 3,133,193
CORONA DISCHARGE APPARATUS FOR THE SURFACE TREATMENT OF PLASTIC RESINS
John Edward Guillotte and Thomas Francis McLaughlin, Jr., Wilmington, Del., assignors to E. I. du Pont de Nemours and Company, Wilmington, Del., a corporation of Delaware
Filed Jan. 22, 1962, Ser. No. 167,518
7 Claims. (Cl. 250—49.5)

This invention relates to a novel apparatus for treating the surface of plastic articles with a corona discharge, and more particularly to an apparatus for the treatment of the surface of an article made from a hydrocarbon resin with a corona discharge in order to render the surface more readily printable, which apparatus is located on one side only of the plastic article.

Heretofore, it was known that articles made of polyethylene and like hydrocarbon polymers could be rendered more printable by treatment of the surface of the article with a corona discharge. The prior art apparatus for treating such articles consisted of an electrode located near the surface of the article which it was desired to treat, and a second electrode, usually a roller, in contact with the opposite surface. An alternating electric potential was applied between these electrodes to produce a corona discharge, while simultaneously the article was urged over the roller electrode so that the surface was briefly exposed to the discharge.

Equipment such as that described hereinabove has proved very effective for the treatment of films, sheets, and like articles of polyethylene, but possesses several serious disadvantages. For example, the treatment of molten webs of material has proved difficult since it is desirable that contact with rollers or the like, which may deform the web, be avoided. Likewise, it has proved difficult to treat the exterior surface of articles such as bottles, pipe, or the like. Again, where very thick articles are to be treated, the use of electrodes on opposite sides of the article requires an extremely high voltage to produce the discharge, which is inconvenient. Even greater difficulties are encountered where the article is of non-uniform thickness, and indeed this factor alone may render uniform treatment of the surface with a corona discharge impossible. Another defect of the prior art apparatus was that it imparted an electrical stress to the article being treated. If a pinhole or the like passed between the electrodes, a direct discharge took place tending to open the pinhole. In the case of very thin film, pinholes could even be created by the action of the discharge. The difficulties encountered by placing the film to be treated in the path of the discharge could in part be avoided by covering the roller electrode with a thin layer of a dielectric material, or by limiting the current in the discharge by suitable electrical circuiting.

It is therefore an object of the present invention to provide an apparatus for treating plastic articles with a corona discharge which is locatable entirely on one side of the article to be treated.

Another object is to provide an apparatus for treating plastic articles with a corona discharge which does not subject the article to electrical stress.

Still another object is to provide an apparatus for treating articles with a corona discharge which avoids physical contact with the article.

Other objects will become apparent hereinafter.

The above objects are achieved by providing two spaced electrodes with discharging regions of the electrodes substantially parallel to each other and of which one or both is provided with a solid dielectric shield or other means to prevent direct discharge through the entire gas-filled space between the electrodes. An alternating high voltage source is provided to produce a corona discharge between the electrodes of the assembly and means are provided, located between the electrodes, to deflect the discharge in an arcuate form away from the deflecting means so that the surface of the article to be treated may be bathed in the discharge without contacting the apparatus.

The expression "corona discharge," wherever employed in this specification or in the appended claims, is defined as a self-sustaining electrical discharge which does not traverse the entire distance between the electrodes.

In the foregoing definition, the expression self-sustaining means a discharge which is sustained by the electrical voltage between the electrodes when all exterior ionizing sources are withdrawn.

The minimum electrical voltage which is required to produce a corona discharge is dependent on a variety of factors including the distance between the electrodes, the shape of the electrodes, the nature of the gaseous atmosphere including chemical composition, temperature, pressure, and humidity, or the dielectric material employed as a covering and in the frequency of the alternating potential. As a rough rule of thumb, for discharge in an air atmosphere, a potential greater than 50 volts/mil should be employed.

The corona discharge takes place in the air space between the electrodes in such a manner that substantially the shortest air path is traversed. If one or both of the electrodes has a substantial cross section, for example if flat plates are employed as the electrodes, the discharge will take place between the regions of the electrodes which are in closest proximity to each other. In the foregoing and hereinafter this region of the electrode is referred to as the discharging region.

While it is possible to attain direct current corona discharges, these are very difficult to sustain, and an alternating voltage between the electrodes should be employed. The frequency may be very low, for example 60 c.p.s., but greater efficiency is obtained with higher frequency discharges, the frequencies suitably being of the order of from 1500 c.p.s. to 450,000 c.p.s., but even higher frequencies are operable. The use of higher frequencies is highly desirable from the point of view of personal safety, as will be appreciated by those skilled in the art.

A suitable source of electrical potential is a high frequency high voltage transformer fed by a spark-gap oscillatory circuit, known as a Lepel generator. Very little electrical current is required.

Another suitable source is a motor drive generator producing an electric current having a frequency of the order 1500 to 3000 cycles per second at a voltage several hundred volts which feeds a high voltage transfer to produce the high voltages needed for the corona discharge.

Yet another means to supply the necessary high frequency, high voltage, low current discharge, is to generate a high frequency electrical current by an electronic tube oscillator and transform them to the necessary high voltage by a high frequency transformer.

Many other devices for producing a suitable electrical source for corona discharges will be apparent to those skilled in the art.

Suitably, a voltage of about 100,000 volts should be employed with the electrodes spaced to provide an air gap of about one inch. It will be realized, however, that the distance between the electrodes and the voltage may be varied widely, and are not a critical feature of this invention.

All known solid dielectric materials are subject to attrition by the action of a corona discharge. Generally speaking, the inorganic dielectrics such as glass, quartz, ceramics and the like are less readily attacked than organic substances such as the thermoplastic and thermosetting resins. In the category of inorganic dielectrics, materials such as glass, which are slightly conductive, appear to have the greatest resistance to the discharge. It is believed that this resistance is in part due to the dissipation of localized static electrical charges caused by the action of the corona.

A corona discharge may be maintained between unshielded conducting electrodes, however, it is highly desirable that at least one of the electrodes be screened by a relatively thin film of a solid dielectric material. Suitable thicknesses for this screen are from 0.001" to about 0.25". This thickness is not, however, critical. This screening should be readily replaceable.

In one embodiment of this invention, a screened electrode was employed which consisted of a thick-walled glass capillary tube through the center of which passed the copper wire electrode.

In another, and preferred, embodiment of this invention the screen consisted of a molecularly oriented film of polyethylene terephthalate which was passed over the electrode so that the region in proximity to the other electrode was completely covered. Such films were found to withstand the action of the corona discharge for a period of about eight hours after which time they should be replaced. It is contemplated to provide a roll of polyethylene terephthalate film and a wind-up mechanism whereby such replacement is made continuously and automatically.

The preferred means of deflecting the discharge into the desired arcuate form is a solid dielectric placed between, and in contact with, the electrodes, and having a cross section with a curved boundary over which the discharge passes. A preferred material for this device is soda glass.

Another means of deflecting the arc into the desired form is to provide a gentle stream of gas from a slit-shaped orifice in a chamber made of an electrical insulator spaced between the electrodes. The gas employed may be air or other gas such as the noble gases, nitrogen, or the like. It is also contemplated to employ chemically active gases and vapors in the air-knife.

The invention will be better understood by reference to the drawings which accompany this specification.

In these drawings:

FIGURE 1 shows an overall view of an electrode assembly with a dielectric deflecting means for the production of a corona discharge.

FIGURE 2 is a cross sectional view of the apparatus of FIGURE 1 which shows how the discharge may be applied to the surface of a thermoplastic article.

FIGURE 3 shows a cross sectional view of an apparatus for the production of a deflected corona discharge using an air knife to produce the deflection.

FIGURE 4 shows an electrical circuit suitable for the production of a high frequency high voltage suitable for the production of a corona discharge.

Referring now to FIGURE 1, in that figure the electrodes 1 and 2 are constructed of metal strips having a rounded edge. The electrode 1 is covered by a sheet 3 of plastic material, such as polyethylene terephthalate. The electrodes are separated by a plate of soda glass 4 having a rounded edge 5 adjacent to the rounded edges of the electrodes, the other edge of the glass plate extending beyond the electrode so that discharge is localized over the rounded edge 5. The assembly is supported between two insulator blocks, which may be a resin such as polytetrafluoroethylene.

In FIGURE 2, the various parts of the apparatus are indicated by the same number as in FIGURE 1. The corona discharge 6 is formed in an arcuate configuration over the curved edge of the soda glass plate 4. The article to be treated is passed over the apparatus in the position shown so that the surface is bathed in the discharge.

FIGURE 3 shows a section of an apparatus employing an air knife to deflect the discharge. The electrodes are designated by the numbers 8 and 9, the dielectric screening by 10 and 11, and the air knife itself, constructed from glass, by 12.

FIGURE 4 shows an electrical circuit which may be employed to produce a high frequency alternating voltage.

The electrical circuit consists of a low voltage alternating current source 13, which may conveniently be the common domestic alternating current source of 110 volts, 60 cycles per second frequency. The voltage from 1 is fed to an iron cored, high resistance, current limited, transformer 14 which increases the voltage to a value of the order of several thousand volts. In the secondary circuit of the transformer 14 is an adjustable spark gap 15, a capacitor 16, and the primary circuit 17 of a high frequency, high voltage transformer, which may be a Tesla coil or the like. High frequency, high voltage electricity is provided by the secondary circuit 18, which is suitable for maintaining a corona discharge, to the output terminals 19.

The apparatus of the present invention is adaptable to the treatment of a wide variety of objects for example, bottles may be readily treated to render their surfaces more printable by providing an indexing rotating table fitted with rotating stands driven by a ring gear to which the bottles may be firmly attached by their necks, so that each bottle in turn is presented to the discharge apparatus and rotated to treat at least a portion of the surface with the discharge.

In another adaptation, the electrodes may be constructed in an annular configuration, so that the surface of pipe may be subjected to a corona discharge by passing it through the annulus as it emerges from the extruder forming box.

Many other modifications of this invention will be apparent to those skilled in the art.

We claim:

1. An apparatus for treatment of the surface of plastic articles with a corona discharge which comprises a first electrode; a second electrode spaced from said first electrode, the discharging regions of said first and said second electrodes being substantially parallel with each other, means, comprising a dielectric material placed over the discharge region of at least one electrode, to prevent a discharge traversing the entire distance between the said first electrode and the said second electrode, means to produce an alternating high voltage between said first electrode and said second electrode whereby a corona discharge is produced, deflecting means between said first electrode and said second electrode, whereby said discharge is deflected in an arcuate form, and means to transport a plastic article past said apparatus with a surface of the article tangentially in contact with the said corona discharge at a region of the discharge opposite the said deflecting means.

2. An apparatus for the treatment of the surface of plastic articles with a corona discharge which comprises a first electrode, a second electrode spaced from said first electrode, the discharging regions of said first and said second electrodes being substantially parallel with each other, means, comprising a dielectric material placed over the discharge region of at least one electrode, to prevent a discharge traversing the entire distance between the said first electrode and the said second electrode, means to produce an alternating high voltage between said first electrode and said second electrode whereby a corona discharge is produced, a solid dielectric deflecting plate having a cross section with a convexly curved surface, said plate located between the said first electrode and the said second electrode whereby the discharge is deflected over the curved surface of the said deflecting plate, and means to transport a plastic article past said apparatus with a surface of the article tangentially in contact with the said corona discharge at a region of the discharge opposite the said deflecting plate.

3. Apparatus of claim 2 in which the deflecting plate is made of soda glass.

4. An apparatus for the treatment of the surface of plastic articles with a corona discharge which comprises a first electrode, a second electrode spaced from said first electrode, the discharging regions of said first and said second electrodes being substantially parallel with each other, means, comprising a dielectric material placed over the discharge region of at least one electrode, to prevent a discharge traversing the entire distance between the said first and the said second electrodes, means to produce an alternating high voltage between said first electrode and said second electrode whereby a corona discharge is produced, and an air knife located between the said first and the said second electrodes whereby said discharge is deflected in an arcuate form.

5. An apparatus for the treatment of the surface of plastic articles with a corona discharge which comprises a first electrode, a second electrode spaced from said first electrode, the discharging regions of said first and said second electrodes being substantially parallel with each other, said second electrode being screened from said first electrode by a screen of a solid dielectric material having a thickness of from 0.001 inch to 0.25 inch about the discharge region of the said second electrode, means to produce an alternating high voltage between the said first electrode and the said second electrode whereby a corona discharge is produced, and deflecting means between the said first electrode and the said second electrode whereby said discharge is deflected in an arcuate form, and means to transport a plastic article past said apparatus with a surface of the article tangentially in contact with the said corona discharge at a region of the discharge opposite the said deflecting means.

6. Apparatus of claim 5 in which said screen is a film of polyethylene terephthalate.

7. An apparatus for the treatment of the surface of plastic articles with a corona discharge which comprises a first electrode, a second electrode spaced from said first electrode, the discharging regions of said first and said second electrodes being substantially parallel with each other, said second electrode being screened from said first electrode by a film of polyethylene terephthalate about the discharge region of the said second electrode, means to produce an alternating high voltage between said first electrode and said second electrode whereby a corona discharge is produced, a solid dielectric deflecting plate having a cross section with a convexly curved surface, said plate being located between the said first electrode and the said second electrode whereby the said discharge is deflected over the curved surface of the said deflecting plate, and means to transport a plastic article past said apparatus with a surface of the article tangentially in contact with the said corona discharge at a region of the discharge opposite the said deflecting plate.

References Cited in the file of this patent

UNITED STATES PATENTS

| | | |
|---|---|---|
| 2,867,912 | Kritchever | Jan. 13, 1959 |
| 2,879,396 | McDonald | Mar. 24, 1959 |
| 2,939,956 | Parks | June 7, 1960 |